US012160937B2

(12) United States Patent
Hwang

(10) Patent No.: US 12,160,937 B2
(45) Date of Patent: Dec. 3, 2024

(54) SURFACE TYPE HEATING ELEMENT AND MANUFACTURING METHOD THEREOF

(71) Applicant: LG ELECTRONICS INC., Seoul (KR)

(72) Inventor: Deok Hyun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 804 days.

(21) Appl. No.: 16/899,067

(22) Filed: Jun. 11, 2020

(65) Prior Publication Data

US 2020/0396800 A1 Dec. 17, 2020

(30) Foreign Application Priority Data

Jun. 12, 2019 (KR) ........................ 10-2019-0069423

(51) Int. Cl.
*H05B 3/16* (2006.01)
*B22F 7/04* (2006.01)
(Continued)

(52) U.S. Cl.
CPC ................ *H05B 3/16* (2013.01); *B22F 7/04* (2013.01); *H05B 3/26* (2013.01); *H05B 3/74* (2013.01);
(Continued)

(58) Field of Classification Search
CPC .......... B22F 7/04; B22F 2301/15; B22F 3/10; B22F 2007/042; C22C 19/05;
(Continued)

(56) References Cited

U.S. PATENT DOCUMENTS 811,859 A * 2/1906 Marsh
6,919,543 B2 * 7/2005 Abbott .............. H01L 21/67103 219/469
8,143,554 B2 * 3/2012 Lofy ........................ H05B 3/16 219/217
(Continued)

FOREIGN PATENT DOCUMENTS

DE 102017219960 A1 * 5/2019
EP 3 364 715 A1 8/2018
(Continued)

OTHER PUBLICATIONS

MWS Wire Industries, Resistance Wire, Mar. 16, 2018, MWS Wire Industries (Year: 2018).*

*Primary Examiner* — Dana Ross
*Assistant Examiner* — Joseph W Iskra
(74) *Attorney, Agent, or Firm* — Birch, Stewart, Kolasch & Birch, LLP

(57) ABSTRACT

Discussed is a surface type heating element which generates heat using electricity and a method of manufacturing the surface type heating element. The surface type heating element includes a NiCr alloy and has an adhesive strength of 3 N or more with respect to a substrate or an insulating layer and an electrical resistivity of $10^{-4}$ to $10^{-2}$ Ωcm, and thus it can be used even at a high operating temperature of 400° C. or more, suppresses the elution of the material itself, and has high fracture toughness, a low coefficient of thermal expansion, and heat resistance, resulting in improvement of the reliability and lifetime of the product.

18 Claims, 7 Drawing Sheets

(51) Int. Cl.
*C22C 19/05* (2006.01)
*H05B 3/26* (2006.01)
*H05B 3/74* (2006.01)

(52) U.S. Cl.
CPC .......... *B22F 2301/15* (2013.01); *C22C 19/05* (2013.01); *H05B 2203/013* (2013.01); *H05B 2203/017* (2013.01)

(58) Field of Classification Search
CPC ... C22C 19/058; C04B 35/581; C04B 35/583; C04B 35/584; H05B 3/12; H05B 3/16; H05B 3/18; H05B 3/26; H05B 3/28; H05B 3/74; H05B 3/265; H05B 3/283; H05B 2203/013; H05B 2203/017
USPC ........................................................ 219/451.1
See application file for complete search history.

(56) References Cited

U.S. PATENT DOCUMENTS

| | | | | |
|---|---|---|---|---|
| 2004/0074893 | A1 | 4/2004 | Wermbter et al. | |
| 2006/0118102 | A1 | 6/2006 | Wermbter et al. | |
| 2018/0242402 | A1* | 8/2018 | Jeong | H05B 3/688 |

FOREIGN PATENT DOCUMENTS

| | | | | | |
|---|---|---|---|---|---|
| JP | 5300473 | B2 | | 9/2013 | |
| KR | 10-2002-0079155 | A | | 10/2002 | |
| KR | 10-2010-0065883 | A | | 7/2010 | |
| KR | 10-1637122 | B1 | | 7/2016 | |
| KR | 1637122 | B1 | * | 7/2016 | H05B 3/12 |
| KR | 10-2017-0066078 | A | | 6/2017 | |
| KR | 10-2018-0096414 | A | | 8/2018 | |
| WO | WO2018097321 | | * | 5/2018 | |

* cited by examiner

SURFACE TYPE HEATING ELEMENT AND MANUFACTURING METHOD THEREOF

CROSS-REFERENCE TO RELATED APPLICATION

This application claims priority to and the benefit of Korean Patent Application No. 10-2019-0069423, filed in the Republic of Korea on Jun. 12, 2019, the entire contents of which is expressly incorporated by reference into the present application.

BACKGROUND OF THE INVENTION

1. Field of the Invention

The present disclosure relates to a surface type heating element which generates heat using electricity in the field of heating devices such as electric ranges and a method of manufacturing the surface type heating element.

2. Description of the Related Art

Cooktops used as household or commercial cooking appliances are cooking appliances that heat food contained in a container placed on the upper surface of the cooktop by heating the container.

Conventionally, cooktops in the form of a gas stove which generate a flame using gas was used, but cooktops in the form of an electric range including a surface type heating element which generate heat by applying an electric current are gradually being used.

As the surface type heating element, a metal heating element made by etching a metal thin plate containing iron, nickel, silver, or platinum or a ceramic sintered body made by sintering a non-metal heating element containing silicon carbide, zirconia, or carbon is being used.

Recently, a method of manufacturing a surface type heating element which does not require high temperature thermal treatment required for manufacturing the conventional surface type heating element, such as a photonic sintering method disclosed in Korean Registered Patent No. 10-1637122 (registered on Jun. 30 2016, and hereinafter, referred to as a "prior art"), is known.

The photonic sintering method of the prior art is a method of sintering a paste including ceramic powder by irradiating the paste with light energy using white light.

The surface type heating element including ceramic powder in the prior art has the following fundamental problems.

First, since most ceramic materials are non-conductive, they have inherent high resistivity compared to metal materials that are conductive.

The high resistivity of the ceramic material lowers the output of the surface type heating element, thereby limiting the operating temperature of a final product cooktop.

In addition, the ceramic materials have poor mechanical properties due to having low ductility and low toughness.

In particular, since the ceramic materials have low toughness, detachment and destruction of the surface type heating element result from thermal deformation or thermal stress that is caused by repeatedly heating and cooling the surface type heating element and impact caused by cooking utensils.

Furthermore, the ceramic materials have a large difference in coefficient of thermal expansion from glass which is frequently used as a substrate of a cooktop and the like.

As the difference in the coefficient of thermal expansion between the substrate and the surface type heating element increases, a difference in the degree of thermal deformation therebetween also increases, and as a result, higher thermal stress or thermal shock is applied to the surface type heating element.

Meanwhile, when metal materials are applied as a surface type heating element, the metal material is different from a ceramic material which is to be used as a substrate, thereby different problems arise from the ceramic material in the prior art.

First, the problem of joining dissimilar materials is one of the challenges that have not been solved in the material field for a long time.

The conventional surface type heating element was manufactured by a thermal sintering method in which a paste, which is made by adding a large amount of glass frit having a bonding function with glass to a metal material powder, is heated at high temperature.

However, the thermal sintering method has a fundamental problem of causing the deformation of a glass substrate. Also, when the amount of the glass frit added in the paste is less than or equal to several % by weight (hereinafter, also referred to as "wt %" or "%"), the adhesion between the substrate and the surface type heating element including the metal material as a main component is decreased, and thus the surface type heating element is peeled off or detached from the substrate. On the other hand, when the amount of the glass frit added in the paste is increased, resistivity which is an inherent advantage of the metal material is not satisfied.

Meanwhile, although the prior art mentions that photonic sintering using a metal material is possible, a surface type heating element using a metal material is not disclosed at all through the examples.

In particular, the metal materials described in the prior art inherently do not have a high melting point, and furthermore, alloys of the metal materials with other components have a lower melting point. Therefore, when the metal materials are used in the surface type heating element for a long time, metal components are diffused or eluted, resulting in degradation of the lifetime and reliability of the product.

In addition, the prior art proposes, as metal materials, components such as lithium, sodium, potassium, cadmium, mercury, boron, potassium, silicon, germanium, and the like, and all of the above components are components that are difficult to be used or are prohibited from being applied as a surface type heating element and have a problem of including a non-metal or a semiconductor.

SUMMARY OF THE INVENTION

To solve the above problems, the present disclosure is directed to providing a surface type heating element including a metal material as a main component.

Specifically, the present disclosure is directed to providing a surface type heating element including a metal material as a main component which enables stable output at an operating temperature of a cooktop while not lowering the output of the surface type heating element and not increasing the thickness of the surface type heating element, and a manufacturing method thereof.

More specifically, the present disclosure is directed to providing a surface type heating element including a metal material having a low temperature coefficient of resistance, which indicates a change in resistance value according to temperature, to ensure a user's safety against an overcurrent by lowering an initial inrush current required at the beginning of the operation of the surface type heating element, and a manufacturing method thereof.

In addition, the present disclosure is directed to providing a surface type heating element including a metal material as a main component which has high resistance to thermal stress or thermal shock and high resistance to external impact by ensuring high ductility and/or high toughness, and a manufacturing method thereof.

Additionally, the present disclosure is directed to providing a surface type heating element including a metal material for high temperature as a main component which has a small difference in coefficient of thermal expansion between a substrate and/or an insulating layer and the surface type heating element to reduce the thermal stress or thermal shock applied to the surface type heating element, and a manufacturing method thereof.

In particular, the present disclosure is directed to providing a surface type heating element which is capable of suppressing the diffusion and elution of metal components even when used at high temperature for a long time by including a high-melting-point metal material for high temperature as a main component, and a manufacturing method thereof.

Furthermore, the present disclosure is directed to providing a surface type heating element including a metal material as a main component which has excellent adhesion to not only a substrate made of the same material but also a substrate made of a dissimilar material, and a manufacturing method thereof.

The objects of the present disclosure are not limited to the above-mentioned objects, and other objects and advantages of the present disclosure which are not mentioned can be understood by the following description and more clearly understood by exemplary embodiments of the present disclosure. In addition, it will be readily apparent that the objects and advantages of the present disclosure can be realized by means indicated in the claims and a combination thereof.

A surface type heating element according to one embodiment of the present disclosure for achieving the above objects has a main technical feature in that the surface type heating element is made of a metal material including a NiCr alloy.

Specifically, according to the surface type heating element of an embodiment of the present disclosure, a Ni content of the NiCr alloy can range from 60 to 95 wt % (hereinafter, also referred to as "%").

More specifically, the surface type heating element according to an embodiment of the present disclosure can have an electrical resistivity of $10^{-4}$ to $10^{-2}$ Ωcm.

Particularly, the surface type heating element can have an adhesive strength of 5 N or more with respect to a substrate or an insulating layer thereunder.

In this instance, the substrate can be formed of any one of glass, a glass ceramic, $Al_2O_3$, AlN, polyimide, polyether ether ketone (PEEK), and a ceramic.

For example, the substrate can be formed of glass or a glass ceramic.

For example, the substrate can be formed of a glass ceramic.

The insulating layer can include any one of boron nitride, aluminum nitride, and silicon nitride.

The insulating layer can further include glass frit as a binder.

In this instance, the binder or glass frit can include a borosilicate component and/or a bentonite component.

A method of manufacturing a surface type heating element according to another embodiment of the present disclosure for achieving the above objects has a main technical feature in that the method includes coating the substrate with a surface type heating element layer by applying a surface type heating element paste including a NiCr alloy powder onto the substrate.

Specifically, a Ni content of the NiCr alloy powder can range from 60 to 95 wt % (hereinafter, also referred to as "%"), and the NiCr alloy powder can have a particle size of 10 nm to 10 μm.

In this instance, the substrate can be formed of any one of glass, a glass ceramic, $Al_2O_3$, AlN, polyimide, polyether ether ketone (PEEK), and a ceramic.

In addition, the method of manufacturing a surface type heating element according to another embodiment of the present disclosure has another main technical feature in that the method includes photonically sintering the surface type heating element paste including the NiCr alloy powder applied onto the substrate.

Specifically, a total light irradiation intensity in the photonic sintering can range from 40 to 70 J/cm$^2$.

More specifically, the method of manufacturing a surface type heating element of the present disclosure includes: coating a substrate with a surface type heating element layer by applying a surface type heating element paste including a NiCr alloy onto a substrate; drying the applied surface type heating element layer; and photonically sintering the dried surface type heating element layer.

In addition, the method can further include, before the coating with a surface type heating element layer, forming an insulating layer on a substrate.

In this instance, the insulating layer can include any one of boron nitride, aluminum nitride, and silicon nitride.

The insulating layer can include, as a binder, glass frit including a borosilicate component and/or a bentonite component.

Meanwhile, the surface type heating element paste can further include glass frit, an organic binder, and a solvent in addition to the NiCr alloy powder.

In addition, the surface type heating element paste can further include an additive.

The surface type heating element paste can include, as a specific and non-limiting example, the NiCr alloy powder at 30 to 80%, the glass frit at 3% or less (excluding 0%), the organic binder at 10 to 30%, the solvent at 5 to 30%, and the additive at 1 to 10 wt %.

In this instance, the organic binder can be ethyl cellulose, and the solvent can be butyl carbitol acetate.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE EMBODIMENTS

Figure 1:
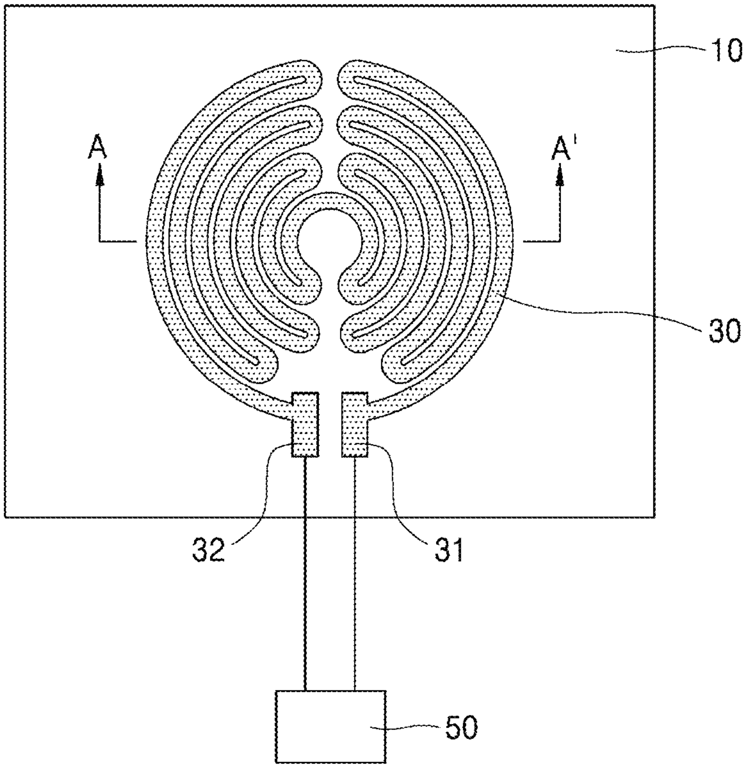
FIG. 1 is a plan view of a surface type heating device according to an embodiment of the present disclosure as viewed from above a substrate.

The above objects, features and advantages of the present disclosure will be described in detail with reference to the accompanying drawings, and therefore, the technical idea of the present disclosure should be easily implemented by those of ordinary skill in the art. In the following description of the present disclosure, when a detailed description on the related art is determined to unnecessarily obscure the subject matter of the present disclosure, the detailed description will be omitted. Hereinafter, exemplary embodiments of the present disclosure will be described in detail with reference to the accompanying drawings. In the drawings, the same reference numerals are used to indicate the same or similar components.

Hereinafter, the disposition of any component disposed on an "upper portion (or lower portion)" of a component or disposed "on (or under)" a component can mean that not only the arbitrary component is disposed in contact with the upper surface (or lower surface) of the component, but also another component can be interposed between the component and the arbitrary component disposed on (or under) the component.

In addition, it should be understood that when an element is described as being "connected" or "coupled" to another element, the element can be directly connected or coupled to another element, other elements can be "interposed" between the elements, or each element can be "connected" or "coupled" through other elements.

Hereinafter, a surface type heating element and a manufacturing method thereof according to some embodiments of the present disclosure will be described.

Figure 2:
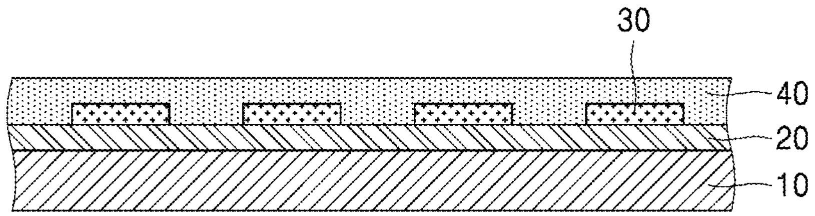
FIG. 2 is an enlarged cross-sectional view illustrating one example of a portion taken along A-A' of the surface type heating device of FIG. 1.
Figure 3:
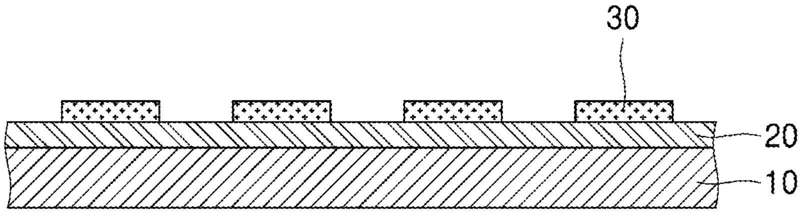
FIG. 3 is an enlarged cross-sectional view illustrating another example of a portion taken along A-A' of the surface type heating device of FIG. 1.

Referring to FIGS. 1 to 3, an electric range 1 according to an embodiment of the present disclosure includes a substrate 10 whose surface is made of an electrically insulating material, an insulating layer 20 disposed on the substrate 10, a surface type heating element layer 30 formed by sintering a predetermined powder containing an oxide powder and disposed on the insulating layer 20 disposed on the substrate 10, and a power supply unit 50 configured to supply electricity to the surface type heating element layer 30. A surface layer 40 can be disposed on the surface type heating element layer 30.

In this instance, the substrate 10 can be manufactured in various sizes and shapes according to the needs of a device using the electric range 1. As a non-limiting example, the substrate 10 of the present disclosure can be a plate-shaped member. In addition, the substrate 10 can have a different thickness for each position in the substrate as necessary. Furthermore, the substrate 10 can be bent as necessary.

In the present disclosure, the material forming the substrate 10 is sufficient when it is an insulating material and not particularly limited. As a non-limiting example, the substrate in the present disclosure can be not only a ceramic substrate containing glass, a glass ceramic, alumina ($Al_2O_3$), aluminum nitride (AlN), or the like but also formed of a polymer material such as polyimide (PI) or polyether ether ketone (PEEK). However, the substrate can include any one of glass, a glass ceramic, and a ceramic. This is because these materials are basically able to ensure insulating properties and are advantageous in terms of anti-staining, an anti-fingerprint effect, and visual properties as compared to other materials. Particularly, a glass ceramic can be the most preferred because the glass ceramic can ensure impact resistance and low expandability in addition to the advantages of general amorphous glass, such as transparency and aesthetics, as compared with other ceramic materials.

As a non-limiting example, the insulating layer 20 can be provided on any one of both surfaces of the substrate 10, for example, the surface on which the surface type heating element layer 30 is formed. When the electric range of the embodiment of the present disclosure includes the insulating layer 20, the insulating layer 20 should be formed on an entirety or part of the substrate 10. In this instance, the part of the substrate means at least a portion of the substrate that the user can touch during operation of the electric range and/or a portion in which the surface type heating element layer and the substrate are in contact with each other.

The insulating layer formed on the substrate after being fired can have a thickness of 5 to 100 μm. When the thickness of the insulating layer is less than 5 μm, it is difficult to ensure the electrical stability of the insulating layer. On the other hand, when the thickness of the insulating layer is more than 100 μm, there are problems such as cracks are highly likely to occur due to a difference in material or coefficient of thermal expansion of the insulating layer, the substrate, and the surface type heating element layer, a large amount of materials are consumed, and a process time increases.

The insulating layer 20 can include, as a main component, any one of boron nitride, aluminum nitride, and silicon nitride, which can stably ensure resistivity even at high temperature. All of the components have a common feature which is a ceramic material-based insulator.

Figure 4:
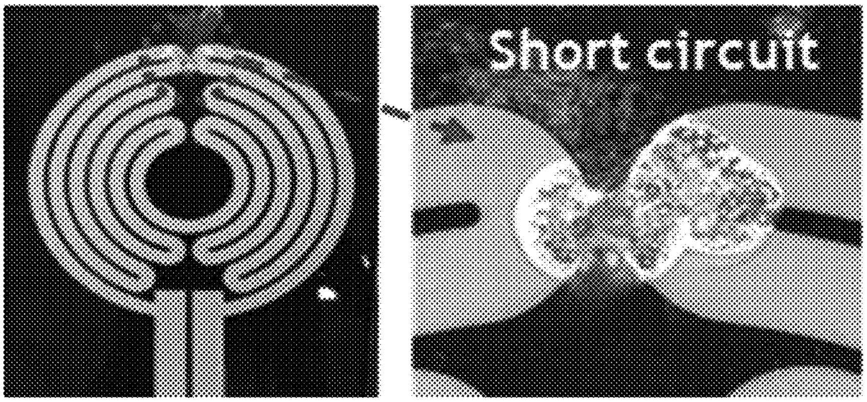
FIG. 4 shows an example in which a heater module is destroyed due to a short circuit occurring in the heating element of the surface type heating element layer due to a decrease in resistivity of a substrate during high-power operation.

When the insulating layer 20 is formed between the substrate 10 and the surface type heating element layer 30, the insulating layer can protect the user from an electric shock occurring due to a back leakage current that can be caused by a decrease in resistivity of the substrate at high temperatures. In addition, the insulating layer 20 prevents a short-circuit current in the surface type heating element layer 30 during high-power operation of the surface type heating element layer 30 due to having relatively high resistivity at high temperature (see FIG. 4). As a result, the surface type heating element layer 30 can be prevented from being destroyed.

The insulating layer 20 of the embodiment of the present disclosure should ensure adhesion to the substrate 10 and/or the surface type heating element layer 30 and, simultaneously, have high temperature resistivity higher than that of the substrate and compatibility with printing and subsequent processes.

To this end, in the embodiment of the present disclosure, it can be more preferable that the insulating layer 20 further includes an inorganic binder. Particularly, it can be more preferable that the insulating layer 20 of the embodiment of the present disclosure includes glass frit as an inorganic binder to reduce a firing temperature. More specifically, the insulating layer 20 of the embodiment of the present disclosure includes borosilicate and/or bentonite as glass frit.

Particularly, since borosilicate has a thermal expansion coefficient of about $50*10^{-7}$ m/° C. which is almost the mean of the thermal expansion coefficients of the substrate 10 and the surface type heating element layer 30 to be described below, it can help to suppress cracking or peeling of the surface type heating element layer 30 due to a difference in coefficient of thermal expansion from the substrate 10.

The electric range of the embodiment of the present disclosure includes the surface type heating element layer 30 on the insulating layer 20 or the substrate 10. In this instance, the heating element of the surface type heating element layer 30 is arranged in a predetermined shape on the substrate 10 or the insulating layer 20 when viewed from above.

As an example referring to FIG. 1, the heating element can be formed on the surface of the insulating layer 20 by extending along a circumference in a zigzag manner while varying a direction based on a semicircle. In this instance, the heating element can be formed continuously from a first terminal unit 31 to a second terminal unit 32 in a predetermined shape.

The surface type heating element layer 30 of the embodiment of the present disclosure includes a Ni—Cr alloy. In the Ni—Cr alloy of the present disclosure, a base material is Ni and Cr is provided as a solute. In this instance, a Cr content in Ni—Cr alloy can range from 5 to 40% by weight (hereinafter, also referred to as "wt %" or "%"). When the Cr content in Ni—Cr alloy is less than 5 wt %, corrosion resistance is decreased, and thus the surface type heating element layer can be vulnerable to high temperature or chemicals. On the other hand, when the Cr content is more than 40 wt %, processability which is a characteristic of the face-centered cubic lattice of the base Ni is degraded, and furthermore, the heat resistance of the Ni—Cr alloy is decreased. As a result, when the electric range is used at high temperature for a long time, the lifetime and reliability of the electric range can be decreased.

The following Table 1 summarizes the mechanical and electrical properties of the NiCr alloy used to form the surface type heating element layer 30 of the embodiment of the present disclosure and materials for a surface type heating element which are currently being used or known.

TABLE 1

Mechanical/electrical properties of materials for surface type heating element

| | Fracture toughness ($MPam^{1/2}$) | Coefficient of thermal expansion (m/° C.) | Resistivity (Ωcm) |
|---|---|---|---|
| Ag | 40~105 | 180 * $10^{-7}$ | 1.6 * $10^{-6}$ |
| Lanthanum Cobalt Oxide | 0.9~1.2 | 230 * $10^{-7}$ | 9.0 * $10^{-3}$ |
| Glass | 0.6~0.9 | 1 * $10^{-7}$ | — |
| $MoSi_2$ | 6.0 | 65~90 * $10^{-7}$ | 2.7 * $10^{-5}$ |
| SiC | 4.6 | 40 * $10^{-7}$ | 1.0 * $10^{-2}$ |
| NiCr | 110 | 120 * $10^{-7}$ | 1.4 * $10^{-4}$ |

First, it can be seen from Table 1 that Ag and NiCr have very high fracture toughness, which is one of the mechanical properties, compared to other ceramic materials due to the inherent ductility and stiffness of metal. When a material for a surface type heating element has high fracture toughness, the material itself has high resistance to thermal shock arising when a surface type heating element is used, and thus the lifetime and reliability of the electric range can be significantly improved.

In addition, it can be seen from Table 1 that the NiCr of the embodiment of the present disclosure has a thermal expansion coefficient lower than that of existing Ag. The coefficient of thermal expansion is one of the important factors that determine thermal stress or thermal shock derived according to a change in temperature arising when a surface type heating element is used. When the NiCr alloy and Ag are exposed to the same change in temperature, the NiCr alloy has a thermal expansion coefficient lower than that of Ag and thus is subjected to less thermal shock or thermal stress compared with Ag. In conclusion, the reduced thermal stress or thermal shock of the surface type heating element made of the NiCr alloy is advantageous for improving the lifetime and reliability of the electric range.

Table 1 shows electrical resistivity in addition to mechanical properties. Most of the materials that can be used as a material for a surface type heating element have an electrical resistivity of about $10^{-5}$ to $10^{-2}$ Ωcm, as measured at room temperature, except for Ag. When the electrical resistivity of the surface type heating element is more than $10^{-2}$ Ωcm, it is likely that the pattern of the heating element cannot be designed due to excessively high resistivity. In addition, when the electrical resistivity is more than $10^{-2}$ Ωcm, the output of the surface type heating element is excessively low, resulting in a low heating temperature, which is unsuitable for use as a cooking appliance. On the other hand, when the electrical resistivity of the surface type heating element is less than $10^{-5}$ Ωcm, the output is very high due to excessively low resistivity, resulting in an excessively high temperature of heat generated by applying an electric current, which is unsuitable in terms of lifetime and reliability.

In view of the above criteria, it can be seen that Ag alone is not suitable for the surface type heating element, whereas the NiCr alloy of the embodiment of the present disclosure can be used alone as well as in combination with other components as the surface type heating element.

Meanwhile, although not shown in Table 1, the materials for the surface type heating element need to have a small change in electrical resistivity according to temperature.

The electrical resistivity of the material generally varies depending on a change in temperature. However, depending on the category of each material type, the behavior of the change in resistivity of the material according to temperature is very different.

For example, in the instance of lanthanum cobalt oxide (LC) or ceramic materials such as $MoSi_2$ and SiC shown in Table 1, electricity is usually transferred by lattice vibration. The lattices constituting the ceramic material vibrate more widely and rapidly as the temperature increases. Therefore, the resistivity of the ceramic material tends to decrease with increasing temperature.

On the other hand, in the instance of metals such as Ag and NiCr shown in Table 1, electricity is transferred by free electrons. The lattices constituting the metal also vibrate more widely and rapidly as the temperature increases. However, in the instance of the metal, the transfer of electricity is usually performed by free electrons, and the movement of free electrons is restricted by the vibration of the lattice. Therefore, the lattices of the metal vibrate more rapidly and widely as the temperature increases so as to interfere with the movement of free electrons. As a result, the electrical resistivity of the metal tends to increase with increasing temperature.

The change in electrical resistivity of the NiCr alloy of the embodiment of the present disclosure is very small within 5% of the range from room temperature to the maximum operating temperature at which the electric range can be used. When the NiCr alloy is used as the surface type heating element of the electric range, an initial inrush current required at the beginning of the operation of the electric range is lowered such that the risk to the user which is caused by an overcurrent is eliminated, and it is possible to stably operate the electric range without an additional unit such as a triode for alternating current (TRIAC).

On the other hand, when Ag is used as the surface type heating element of the electric range, the excessively low resistivity and high temperature coefficient of resistance of Ag result in the risk of considerably increasing an initial inrush current at the beginning of the operation of the electric range and the disadvantage of requiring a separate unit such as a TRIAC.

In the embodiment of the present disclosure, the surface type heating element layer 30 is thickly applied in the form of a paste on the substrate 10 or the insulating layer 20.

The paste of the present disclosure means a mixture of a vehicle containing essential components such as a solvent, an organic binder, and the like and optional components such as various types of organic additives and particles (powder) of an inorganic substance that is responsible for a main function on the substrate after firing (or sintering).

More specifically, the surface type heating element layer 30 of the embodiment of the present disclosure includes a NiCr alloy powder. The NiCr alloy powder of the embodiment of the present disclosure can have an average particle size (D50) of 10 nm to 10 μm. When the NiCr alloy powder has an average particle size (D50) of less than 10 nm, the surface area of the powder is excessively increased, and the activity of the powder is increased. As a result, the NiCr alloy powder in the form of a paste is not uniformly dispersed. On the other hand, when the NiCr alloy powder has an average particle size (D50) of more than 10 μm, due to an excessively large particle size of the NiCr alloy powder, there is less necking between powder particles, or the powder is not uniformly dispersed. As a result, resistivity is excessively increased, and the adhesion between the surface type heating element layer 30 and the substrate 10 or the insulating layer 20 thereunder is decreased.

Meanwhile, the NiCr alloy powder of the present disclosure can be prepared by various methods. As a non-limiting example, the NiCr alloy powder can be prepared by grinding or pulverizing of electrical wires, thermal plasma processing, or the like and can also be prepared by various methods other than the methods exemplified above.

The NiCr alloy powder of the present disclosure can be included in the paste along with other inorganic substances and the vehicle. More specifically, the paste of the embodiment of the present disclosure can include a NiCr alloy powder at 30 to 80 wt %, glass frit at 3 wt % or less (excluding 0 wt %), an organic binder at 10 to 30 wt %, a solvent at 5 to 30 wt %, and various types of additives at 1 to 10 wt %.

The NiCr alloy powder applied in the paste for forming the surface type heating element layer 30 of the present disclosure determines the electrical properties and mechanical properties of the surface type heating element layer 30. Particularly, the NiCr alloy powder determines the resistivity of the final surface type heating element layer 30 to determine the performance of the electric range including the surface type heating element. Furthermore, the NiCr alloy powder determines the fracture toughness and adhesion of the surface type heating element layer 30 to greatly affect the lifetime and reliability of the electric range.

When the content of the NiCr alloy powder is less than 30 wt %, the resistivity of the final surface type heating element layer 30 is excessively increased. In addition, the thickness of the final surface type heating element layer 30 after sintering can be excessively decreased. On the other hand, when the content of the NiCr alloy powder is more than 80 wt %, the adhesion between the final surface type heating element layer 30 and the insulating layer 20 thereunder is decreased.

Among the paste components, the glass frit functions as an inorganic binder that allows the surface type heating element layer 30 to be bonded with the insulating layer 20 thereunder and functions to adjust the resistance of the surface type heating element layer 30. In addition, the glass frit imparts electrode protection and insulating properties to the surface type heating element layer 30.

When the content of the glass frit is 0 wt % (for example, the glass frit is not included), the adhesion of the final surface type heating element layer 30 with the insulating layer 20 thereunder becomes weak. On the other hand, when the content of the glass frit is more than 3 wt %, the resistivity of the final surface type heating element layer 30 is excessively increased, and thus the output thereof is decreased.

Among the paste components, the organic binder functions to mix a NiCr powder and glass frit to disperse the mixture and affects the fluidity of the paste and stability of a coating film when the paste is applied using screen printing or the like.

The organic binder of the present disclosure can include a thermoplastic resin and/or a thermosetting resin. As the thermoplastic binder, acryl-based, ethyl cellulose-based, polyester-based, polysulfone-based, phenoxy-based, and polyamide-based binders can be used. As the thermosetting binder, amino-based, epoxy-based, and phenol-based binders can be used. In this instance, the organic binder can be used alone or in combination of two or more.

When the content of the organic binder is less than 10 wt %, the mechanical stability of a coating film is decreased in coating with the surface type heating element, and thus it is difficult to stably maintain the coating film. On the other hand, when the content of the organic binder is more than 30 wt %, the mechanical stability of the coating film is decreased due to high fluidity, and the thickness of the final surface type heating element layer 30 is excessively decreased.

The solvent can have high volatility sufficient to be evaporated even when a relatively low level of heat is applied under atmospheric pressure while ensuring complete dissolution of the organic substance in the paste, particularly, the polymer. In addition, the solvent should boil well at a temperature below the decomposition temperature or boiling point of any other additives contained in the organic medium. For example, a solvent having a boiling point of less than 150° C., as measured at atmospheric pressure, is most commonly used.

The solvent of the present disclosure is selected according to the type of organic binder. As the solvent, aromatic hydrocarbons, ethers, ketones, lactones, ether alcohols, esters, diesters, or the like can be generally used. As a non-limiting example, such a solvent includes butyl carbitol, butyl carbitol acetate, acetone, xylene, methanol, ethanol, isopropanol, methyl ethyl ketone, ethyl acetate, 1,1,1-trichloroethane, tetrachloroethylene, amyl acetate, 2,2,4-triethyl pentanediol-1,3-monoisobutyrate, toluene, methylene chloride, and fluorocarbon. In this instance, the solvent can be used alone or in combination of two or more. Particularly, a solvent mixed with other solvents can be preferred for complete dissolution of the polymer binder.

When the content of the solvent is less than 5 wt %, the paste does not have sufficient fluidity, and thus it is difficult to form the surface type heating element layer 30 by a coating method such as screen printing. On the other hand, when the content of the solvent is more than 30 wt %, the paste has high fluidity, and thus the mechanical stability of the coating film is decreased.

The paste of the present disclosure can include, as an additive, for example, a plasticizer, a releasing agent, a dispersing agent, a remover, an antifoaming agent, a stabilizer, a wetting agent, and the like. As a non-limiting example, a phosphoric acid-based dispersing agent and the like can be added to uniformly disperse NiCr powder.

The paste for forming the surface type heating element layer 30 of the present disclosure is applied onto the surface of the substrate or the insulating layer after being prepared. The paste can be prepared by mixing the NiCr alloy powder, the glass frit powder, the organic solvent, the organic binder, and the additive using a mixer and a three roll mill at 10 to 30° C. for 2 to 6 hours. As a non-limiting example of the coating method, the paste can be applied using a screen printer. As another example, the surface type heating element layer can be formed by casting the paste on an additional flexible substrate, removing a volatile solvent while heating the cast layer to form a green tape, and laminating the tape on the substrate using a roller.

After the coating step, drying the applied paste for the surface type heating element layer 30 at a predetermined temperature is performed. The drying step is typically performed at 200° C. or less which is a relatively low temperature. In the drying step, the solvent is mainly evaporated.

After the drying step, the surface type heating element layer 30 can be formed by a firing process such as a sintering process.

In a conventional process of manufacturing a surface type heating element, long-term high temperature thermal treatment is performed to fire components having a high melting point, such as metal alloys and ceramics. The long-term high temperature thermal treatment requires an isolated system such as internal insulation. Furthermore, the surface type heating element can be contaminated by contaminants in the long-term high temperature atmosphere so as to damage the surface type heating element. In addition, since the insulating layer 20 and/or the substrate 10 thereunder is/are also exposed to the long-term high temperature atmosphere, the materials that can be used as the insulating layer 20 and the substrate 10 are highly limited, and it is highly likely that the insulating layer 20 and the substrate 10 are contaminated.

On the other hand, in the method of manufacturing a surface type heating element of the present disclosure, a thermal treatment method which does not require long-term high temperature thermal treatment is applied to fire the surface type heating element layer 30. To this end, a photonic sintering process using intense pulsed white light is applied in the method of manufacturing a surface type heating element of the present disclosure.

As a non-limiting example, intense pulsed white light emitted from a xenon lamp can be used. When the dried paste for the surface type heating element is irradiated with intense pulsed white light, the paste is sintered by radiant energy of intense pulsed white light, and thereby the surface type heating element can be formed.

More specifically, when the dried paste is irradiated with intense pulsed white light, first, the organic substances, especially, the binder, present in the paste are burned out. In the preceding drying step, the solvent among organic vehicle components constituting the paste is mainly volatilized. Therefore, after the drying step, the binder among the remaining organic vehicle components serves to bind solid powder components in the dried paste, and thus the mechanical strength of the dried paste can be maintained. Afterwards, the binder is eliminated by radiant energy of radiated intense pulsed white light at an initial stage of photonic sintering, and this phenomenon or step is referred to as binder burnout.

After the binder burnout, most of the organic vehicle components are no longer present in the paste. Accordingly, the remaining powder components are sintered by irradiation with intense pulsed white light, and thereby the final surface type heating element layer 30 is formed. In this instance, the NiCr alloy powder which is a powder component is sintered by the intense pulsed white light to form necks between individual powder particles, and thus the macroscopic resistivity of the surface type heating element layer 30 can be reduced.

A total light irradiation intensity in the photonic sintering process of the present disclosure can range from 40 to 70 J/cm$^2$. When the total light irradiation intensity is less than 40 J/cm$^2$, it is difficult to form necks between NiCr powder particles and coupling between NiCr powder particles, resulting in excessively high resistivity of the heating element layer 30. On the other hand, when the total light irradiation intensity is more than 70 J/cm$^2$, NiCr particles are oxidized due to an excessively high light irradiation intensity, and the oxidation film formed on the surface of NiCr particles causes the resistivity of the surface type heating element layer 30 to be excessively increased.

Meanwhile, the photonic sintering process of the present disclosure can be operated with 1 to 30 pulses during the entire photonic sintering process. A pulse duration (or pulse on time) can range from 1 to 40 ms, and a pulse interval (or pulse off time) can range from 1 to 500 ms.

The surface type heating element layer 30 which has been finally sintered through the photonic sintering process of the present disclosure can have a thickness of 1 to 100 μm. When the thickness of the surface type heating element layer 30 is less than 1 μm, it is difficult to ensure a dimensionally stable surface type heating element layer, and the thermal stability and mechanical stability of the surface type heating element layer 30 are decreased due to local heating. On the other hand, when the thickness of the surface type heating element layer 30 is more than 100 μm, there are problems such as cracks are highly likely to occur due to a difference in material or in coefficient of thermal expansion of the insulating layer, the substrate, and the surface type heating element layer 30, and a process time increases.

Meanwhile, the surface type heating element layer 30 using the NiCr alloy powder of the present disclosure can have an electrical resistivity of $10^{-4}$ to $10^{-2}$ Ωcm. When the electrical resistivity of the surface type heating element is more than $10^{-2}$ Ωcm, the output of the surface type heating element is decreased due to excessively high resistivity. Therefore, the thickness of the surface type heating element should be increased to lower the resistivity of the surface type heating element, but an increase in the thickness of the surface type heating element also affects the coefficient of thermal expansion of the surface type heating element, and thus the stability of the surface type heating element is significantly decreased. On the other hand, when the electrical resistivity of the surface type heating element is less than $10^{-4}$ Ωcm, a current exceeding an allowable current flows due to excessively low resistivity, and thus the output of the surface type heating element is excessively increased. Therefore, in order to increase the resistivity of the surface type heating element, terminal resistance should be increased by reducing the thickness, but the excessively thin thickness of the surface type heating element also causes the heat resistance of the surface type heating element to be decreased.

In addition, the surface type heating element layer 30 of the present disclosure can have an adhesive strength of about 5.0 N or more with respect to the substrate 10 or the insulating layer 20 thereunder. There is no upper limit of the adhesive strength of the surface type heating element layer 30 of the present disclosure. However, when the adhesive strength is less than about 5.0 N, the surface type heating element layer 30 is detached or destroyed due to excessively low adhesive strength, and thus the lifetime and reliability of the electric range are decreased.

EXAMPLES

In an example embodiment of the present disclosure, a paste for a surface type heating element, which included a NiCr alloy powder, an ethyl cellulose binder with an average molecular weight of about 100, a butyl carbitol acetate solvent, and a phosphoric acid-based dispersing agent, was applied through screen printing for a surface type heating element layer coating, then dried, and photonically sintered, thereby manufacturing a surface type heating element layer 30.

Adhesive strength of the surface type heating element layer 30 of the present disclosure was measured using a RST3 model scratch tester commercially available from Anton Paar GmbH. This tester measured adhesive strength while increasing a load from 0 to 30 N, and, in this instance, adhesive strength was measured under the condition that the scratch length of the tip was 5 mm.

The following Table 2 shows the results of measuring the electrical resistivity, oxygen content, adhesive strength, and sintering shrinkage rate of the surface type heating element layer 30 according to a total light irradiation intensity condition in the photonic sintering process of the present disclosure.

TABLE 2

Evaluation of characteristics according to total light irradiation intensity.

| Total light irradiation intensity ($J/cm^2$) | Electrical resistivity (Ωcm) | Oxygen content (wt %) | Adhesive strength (N) | Sintering shrinkage rate (%) |
|---|---|---|---|---|
| 30 | not determined | not determined | Contact failure with or peeling off from substrate | not determined |
| 40 | $4 * 10^{-4}$ | N.A | 5.1 | 20 |
| 60 | $2 * 10^{-4}$ | ~5 | 11 | 35 |
| 70 | $8 * 10^{-3}$ | ~25 | 24 | 45 |
| 80 | not determined | not determined | Substrate destruction | not determined |

First, under the process conditions of the example, for example, a total light irradiation intensity ranging from 40 to 70 $J/cm^2$, both electrical resistivity and adhesive strength were measured to satisfy the requirements of the surface type heating element of the present disclosure.

On the other hand, when the total light irradiation intensity is less than 40 $J/cm^2$, the NiCr alloy powder was not properly sintered. In other words, the surface type heating element layer 30 before and after photonic sintering had substantially the same state. As a result, necks between NiCr alloy powder particles were not properly formed, and thus the surface type heating element layer 30 had high electrical resistivity. Furthermore, the surface type heating element layer 30 did not have sufficient adhesive strength with respect to the substrate and thus was detached from the substrate.

Meanwhile, as the total light irradiation intensity increases, the NiCr alloy powder was more sufficiently sintered and thus further densified. As a result, as the light irradiation intensity increases, a sintering shrinkage rate increased, and thus necks between NiCr alloy powder particles were properly formed. Therefore, both electrical resistivity and adhesive strength satisfying the specifications were measured.

On the other hand, when the total light irradiation intensity is more than 70 $J/cm^2$, the substrate was shrunk due to excessive light irradiation intensity and thus cracked or broken in severe instances.

Figure 5:
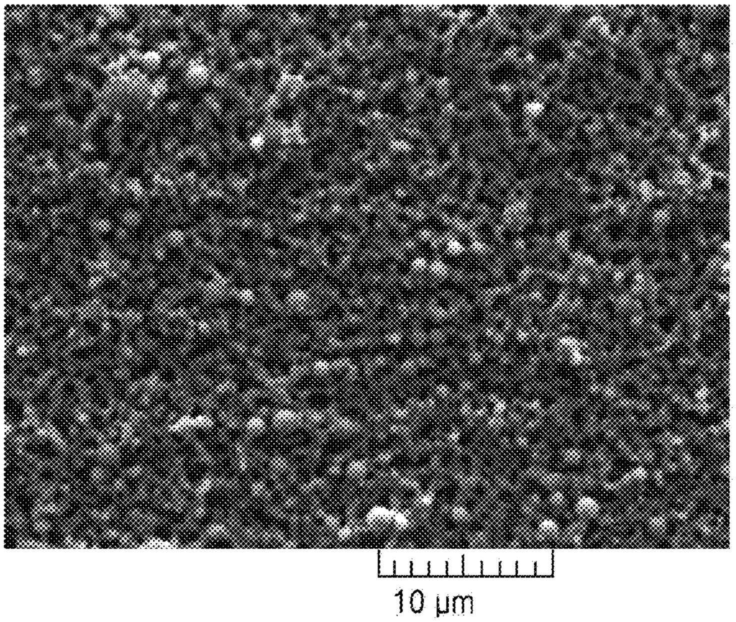
FIG. 5 is an image illustrating the microstructure of a surface type heating element layer 30 formed at a total light irradiation intensity of 40 $J/cm^2$.
Figure 6:
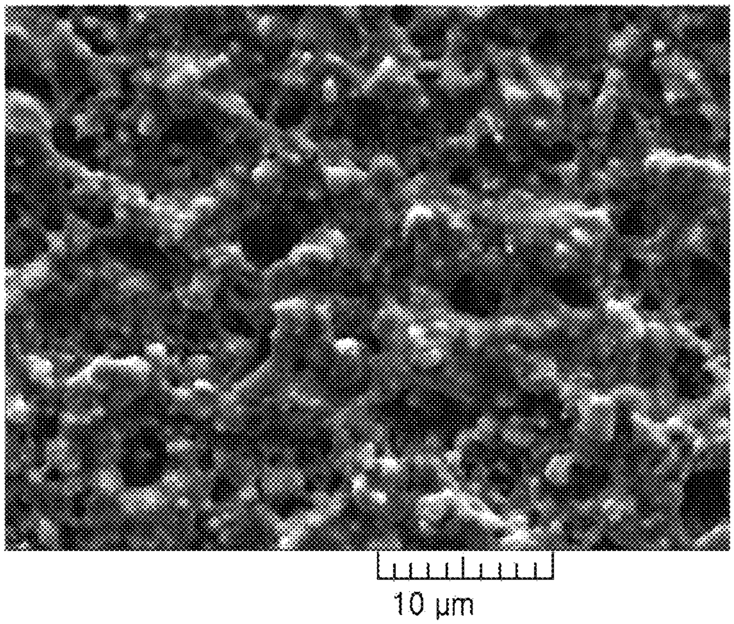
FIG. 6 is an image illustrating the microstructure of a surface type heating element layer 30 formed at a total light irradiation intensity of 60 $J/cm^2$.
Figure 7:
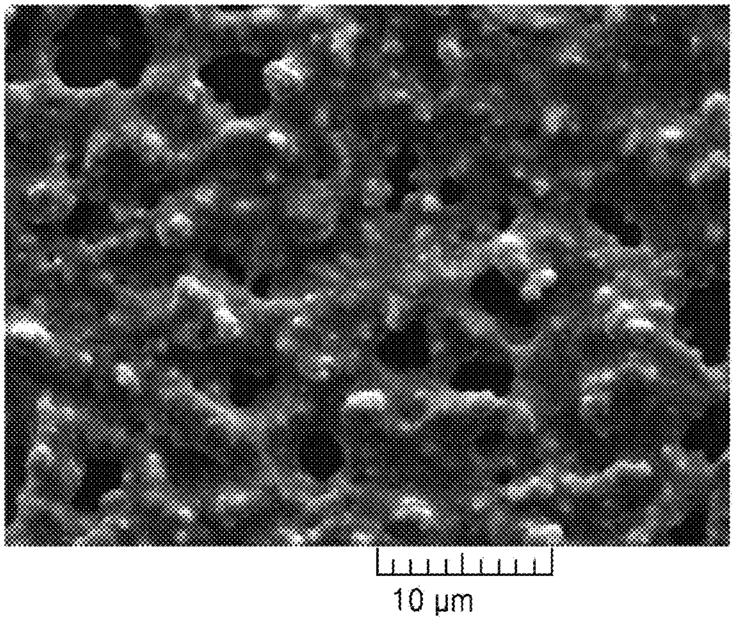
FIG. 7 is an image illustrating the microstructure of a surface type heating element layer 30 formed at a total light irradiation intensity of 70 $J/cm^2$.

FIGS. 5 to 7 show the microstructure of surface type heating element layers 30 formed at total light irradiation intensities of 40, 60, and 70 $J/cm^2$, respectively, according to embodiments of the present disclosure.

As shown in FIGS. 5 to 7, it can be seen that the surface type heating element layer 30 has a microstructure in which necks between NiCr alloy powder particles are developed better as the total light irradiation intensity increases. In addition, the tendency of a microstructure according to a total light irradiation intensity level is very consistent with the measurement results in Table 1. In other words, as a light irradiation intensity increases within the total light irradiation intensity range according to the embodiment of the present disclosure, necks between NiCr alloy powder particles are developed better, resulting in decreased electrical resistivity and increased adhesive strength.

On the other hand, when the total light irradiation intensity is more than 70 $J/cm^2$, the NiCr alloy was excessively oxidized due to excessively high intensity. As a result, it was investigated that even when necks between NiCr alloy powder particles were sufficiently formed, the electrical resistivity of the surface type heating element layer 30 was excessively increased due to the excessive oxidation and thus did not satisfy the specification. In addition, the substrate was shrunk due to excessive light irradiation intensity and thus cracked or broken in severe instances.

According to the present disclosure, a surface type heating element designed using a metal component having a high melting point is provided, and thus the operating temperature of an electric range to which the surface type heating element is applied can further increase, and furthermore, the lifetime and reliability of a cooktop product can be improved by preventing the elution of the metal component at high temperature.

In addition, the surface type heating element according to the present disclosure is designed to have high ductility and fracture toughness inherent to the metal. Therefore, resistance to thermal stress and thermal shock, which are caused due to a difference in temperature and coefficient of thermal expansion between the surface type heating element and a substrate or an insulating layer thereunder, can be ensured.

Furthermore, the surface type heating element of the present disclosure is designed to have a coefficient of thermal expansion lower than that of other metals. As a result, a difference in coefficient of thermal expansion between the surface type heating element and a substrate or an insulating layer thereunder is reduced, and thus the thermal stress and thermal shock applied to the surface type heating element can be decreased.

The decreased thermal stress and decreased thermal shock and the ensured resistance to thermal stress and thermal shock can provide an effect of significantly improving the lifetime and reliability of a cooktop such as an electric range which is a final product.

In addition, since the surface type heating element of the present disclosure includes a metal having a low temperature coefficient of resistance which indicates a change in resistance value according to temperature, an initial inrush current required at the beginning of the operation of a cooktop is lowered, and thus a user's safety against an overcurrent can be ensured. Furthermore, it is possible for the surface type heating element of the present disclosure to not additionally require a control unit such as a triode for alternating current (TRIAC).

In addition, the metal material of the surface type heating element of the present disclosure can be used alone as the surface type heating element without mixing with other metals or ceramic powder because the material itself has a higher resistance value than other metals. Therefore, the surface type heating element of the present disclosure can exhibit improved reactivity with other materials and improved stability and storability of a paste and also achieve a cost reduction effect in terms of material costs.

Meanwhile, a method of manufacturing a surface type heating element according to the present disclosure employs a photonic sintering method, and thus it is possible for a long-term high temperature thermal treatment process to not be performed when compared with a conventional thermal sintering method. Therefore, the manufacturing method of the present disclosure can ensure a degree of freedom in design in selecting the materials of a substrate and/or an insulating layer by excluding a long-term high temperature process.

In addition, the method of manufacturing a surface type heating element of the present disclosure can provide a surface type heating element with higher quality by fundamentally excluding contamination of materials, which can occur from a thermal insulation system in long-term high temperature thermal treatment.

Meanwhile, the method of manufacturing a surface type heating element of the present disclosure essentially eliminates the need for a thermal insulation system required for high temperature thermal treatment and, furthermore, does not require an additional facility for producing a reducing process atmosphere, and thus the process facility can be simplified. In addition, the photonic sintering method in the present disclosure reduces the tact time of the entire process by shortening the unit process time and thus can achieve a productivity improvement effect.

Although the present disclosure has been described above with reference to the illustrated drawings, it is obvious that the present disclosure is not limited to the embodiments and drawings disclosed herein, and various modifications can be made by those skilled in the art within the spirit and scope of the present disclosure. In addition, even when the effect of the configuration of the present disclosure is not explicitly described while the above-described embodiments of the present disclosure are described, it is obvious that the effect predictable by the corresponding configuration should also be recognized.

What is claimed is:

1. A surface type heating element to generate heat using electricity, the surface type heating element comprising:
- a NiCr alloy,
- wherein an adhesive strength of the surface type heating element is about 5 N or more with respect to a substrate or an insulating layer,
- wherein an electrical resistivity of the surface type heating element ranges from about $10^{-4}$ to about $10^{-2}$ Ωcm,
- wherein the insulating layer includes any one of boron nitride, aluminum nitride, and silicon nitride, and
- wherein the insulating layer includes a glass frit as a binder.

2. The surface type heating element of claim 1, wherein a Ni content of the NiCr alloy ranges from about 60 to about 95 wt % of the surface type heating element.

3. The surface type heating element of claim 1, wherein a powder of the NiCr alloy has an average particle size of about 10 nm to about 10 μm.

4. The surface type heating element of claim 1, wherein the substrate is formed of any one of glass, a glass ceramic, $Al_2O_3$, AlN, polyimide, polyether ether ketone (PEEK), and a ceramic.

5. The surface type heating element of claim 1, wherein the glass frit includes at least one of a borosilicate component and a bentonite component.

6. A method of manufacturing a surface type heating element to generate heat using electricity, the method comprising:
- providing a substrate;
- coating the substrate with a surface type heating element layer by applying a surface type heating element paste including a NiCr alloy component onto the substrate;
- drying the applied surface type heating element layer; and
- photonically sintering the dried surface type heating element layer.

7. The method of claim 6, further comprising, forming an insulating layer on the substrate before coating the substrate with the surface type heating element layer,
- wherein the surface type heating element layer is coated on the insulating layer.

8. The method of claim 6, wherein the substrate is formed of any one of glass, a glass ceramic, $Al_2O_3$, AIN, polyimide, polyether ether ketone (PEEK), and a ceramic.

9. The method of claim 7, wherein the insulating layer includes any one of boron nitride, aluminum nitride, and silicon nitride.

10. The method of claim 9, wherein the insulating layer includes a glass frit as a binder.

11. The method of claim 10, wherein the glass frit includes at least one of a borosilicate component and a bentonite component.

12. The method of claim 6, wherein the surface type heating element paste includes:
- a NiCr alloy powder of the NiCr alloy component at about 30 to about 80 wt %;
- a glass frit at about 3 wt % or less and greater than 0 wt %;
- an organic binder at about 10 to about 30 wt %;
- a solvent at about 5 to about 30 wt %; and
- an additive at about 1 to about 10 wt %, of the surface type heating element paste.

13. The method of claim 12, wherein a Ni content of the NiCr alloy powder ranges from about 60 to about 95 wt % of the NiCr alloy powder, and
- wherein the NiCr alloy powder has an average particle size of about 10 nm to about 10 μm.

14. The method of claim 12, wherein the organic binder is ethyl cellulose, and the solvent is butyl carbitol acetate.

15. The method of claim 6, wherein a total light irradiation intensity in the photonic sintering ranges from about 40 to about 70 J/cm2.

16. The method of claim 6, wherein the surface type heating element after the photonic sintering has an electrical resistivity of about $10^{-4}$ to about $10^{-2}$ Ωcm.

17. The method of claim 6, wherein an adhesive strength between the substrate and the surface type heating element after the photonic sintering is about 5 N or more.

18. The method of claim 7, wherein an adhesive strength between the insulating layer and the surface type heating element after the photonic sintering is about 5 N or more.

* * * * *